United States Patent [19]

Koutz et al.

[11] Patent Number: 4,759,899
[45] Date of Patent: Jul. 26, 1988

[54] REACTOR WITH NATURAL CONVECTION BACKUP COOLING SYSTEM

[75] Inventors: Stanley L. Koutz, San Diego; Leonardo Cavallaro, La Jolla; Davorin D. Kapich, Carlsbad, all of Calif.

[73] Assignee: GA Technologies Inc., San Diego, Calif.

[21] Appl. No.: 645,907

[22] Filed: Aug. 29, 1984

[51] Int. Cl.⁴ ............................................. G21C 15/18
[52] U.S. Cl. ...................................... 376/298; 376/282; 376/299
[58] Field of Search ............... 376/282, 402, 403, 404, 376/405, 406, 407, 298, 299

[56] References Cited

U.S. PATENT DOCUMENTS

| | | | |
|---|---|---|---|
| 3,120,471 | 2/1964 | Koutz et al. | 376/404 |
| 3,276,965 | 10/1966 | Leyse | 376/299 |
| 3,285,824 | 11/1966 | Ageron | 376/298 |
| 3,350,277 | 10/1967 | Costes | 376/352 |
| 3,766,007 | 10/1973 | Rolstad et al. | 376/403 |
| 4,033,814 | 7/1977 | Bregeon et al. | 376/298 |
| 4,138,318 | 2/1979 | Speelman | 376/299 |
| 4,363,780 | 12/1982 | Hannerz | 376/282 |
| 4,367,194 | 1/1984 | Schenewerk et al. | |
| 4,526,742 | 7/1985 | Hannerz | 376/298 |

FOREIGN PATENT DOCUMENTS 1026474  4/1966  United Kingdom ................ 376/299

OTHER PUBLICATIONS

Hannerz, Towards Intrinsically Safe Light Water Reactors, Jul. 1983, pp. 5–11, 22–26.

Primary Examiner—Deborah L. Kyle
Assistant Examiner—Richard W. Wendtland
Attorney, Agent, or Firm—Fitch, Even, Tabin & Flannery

[57] ABSTRACT

A nuclear reactor includes a core submerged in a pool of liquid. Under normal conditions, coolant flows through the core without intermixing with the liquid in the pool. In the event of failure of the primary coolant circulation system, liquid from the pool flows through openings in the primary circulation system so as to cool the core by natural convection. Flow through the openings during normal operating conditions may be controlled regardless of the flow rate.

12 Claims, 3 Drawing Sheets

REACTOR WITH NATURAL CONVECTION BACKUP COOLING SYSTEM

BACKGROUND OF THE INVENTION

The present invention relates to nuclear reactors and coolant circulation systems therefor.

A nuclear reactor typically includes a core contained within a vessel and a primary cooling system for pumping a primary coolant through the core. The primary coolant typically travels through a fluid circuit wherein the primary coolant receives heat from the core and is cooled externally in a heat exchanger to transfer heat to a working fluid.

If failure of some element of the fluid circuit occurs, as due to a power failure or an external pipe rupture, and circulation of fluid to the core stops, the core may overheat. Because of the hazards associated with such overheating, a reactor may include a secondary or backup cooling system.

It is desirable that a secondary cooling system begin to function immediately upon reduction of flow in the primary cooling system, without reliance on complicated monitoring systems or on operator intervention. One such proposed system is described in a research memorandum by K. Hannerz entitled "Towards Intrinsically Safe Light Water Reactors," Oak Ridge Associated Universities, Institute for Energy Analysis, DE83-017859, July 1983, which is available through the National Technical Information Service. In the reactor described therein, the core is submerged in a pool of relatively cool water, and a primary coolant is circulated through the core and through steam generators by a pumping system. Two horizontal interfaces between stagnant pool water and stagnant primary coolant in communication with flowing primary coolant are provided, one beneath the core and one offset from the top of a riser which extends about 25 meters above the core. Intermixing of the two fluids at the interfaces is limited by their density differences. At each interface, the higher temperature, lower density primary coolant is above the pool water. If the pressure differential in the primary circuit is equal to the static head differential in the secondary fluid, no secondary fluid will flow through the core. However, in the event of reduction of the pressure of the primary coolant at the interface beneath the core as upon failure of the pumping system, water from the pool rises into the core and the core is cooled by natural convection.

A limitation of the above-described system is that, because the static pressure between the two interfaces is essentially equal to the static pressure difference in the pool, head losses in the core must be offset by natural convection to avoid flow from the pool. Thus, the rate of coolant flow is determined by the level of reactivity in the core which occasions such convection, and cannot be varied independently thereof without upsetting the balance of interfaces.

SUMMARY OF THE INVENTION

In accordance with the present invention, a reactor having its core submerged in a pool of relatively cool secondary coolant includes means to enable flow of secondary coolant from the pool through the core by natural convection as a secondary cooling system, and includes means to enable selection of the flow rate of primary coolant independently of core reactivity.

Accordingly, it is a general aspect of the present invention to provide a nuclear reactor having a novel cooling system.

It is a more particular aspect of the present invention to provide a nuclear reactor which has a primary cooling system having a flow rate which may be varied independently of core reactivity so as to enable control of coolant inlet and outlet temperatures, and a secondary cooling system which begins functioning immediately upon reduction of primary coolant flow below a predetermined minimum.

Further aspects, objects and advantages of the present invention are set forth in the following description and in the accompanying drawings.

DETAILED DESCRIPTION OF THE PREFERRED EMBODIMENT

Figure 1:
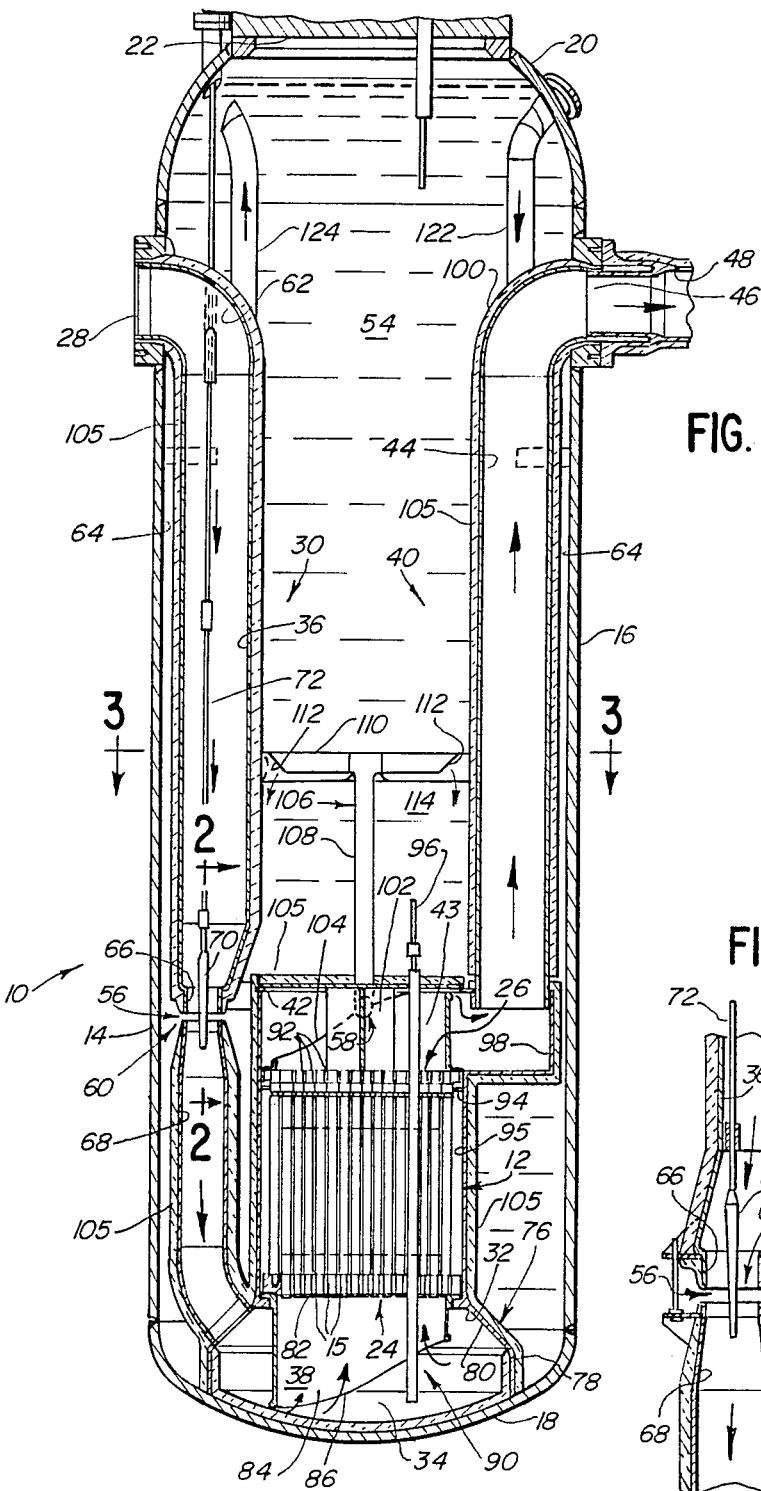
FIG. 1 is an axial vertical sectional view of a reactor in accordance with the present invention.
Figure 2:
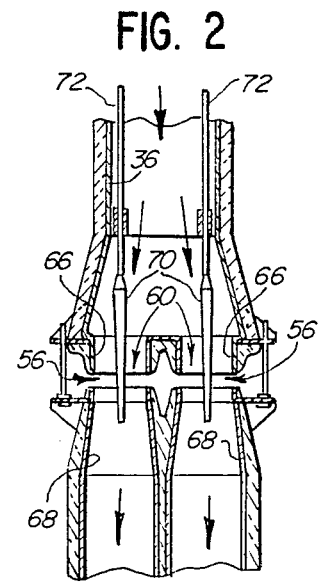
FIG. 2 is a sectional view taken substantially along line 2—2 in FIG. 1 and looking in the direction of the arrows.

Very generally, the preferred embodiment of the present invention comprises a nuclear reactor 10 having a core 12 supported within a closed vessel 14 and means for providing flow of primary coolant through the core 12. The core 12 is made up of a plurality of generally vertically oriented, elongated fuel elements 15. The vessel 14 in the illustrated embodiment is an elongated tank of generally circular cross-section comprising a generally cylindrical side wall 16, a closed bottom 18, and a top 20. The top generally has a removable cover plate 22 thereon which provides access to the interior of the vessel 14 for refueling, maintenance, etc.

Figure 5:
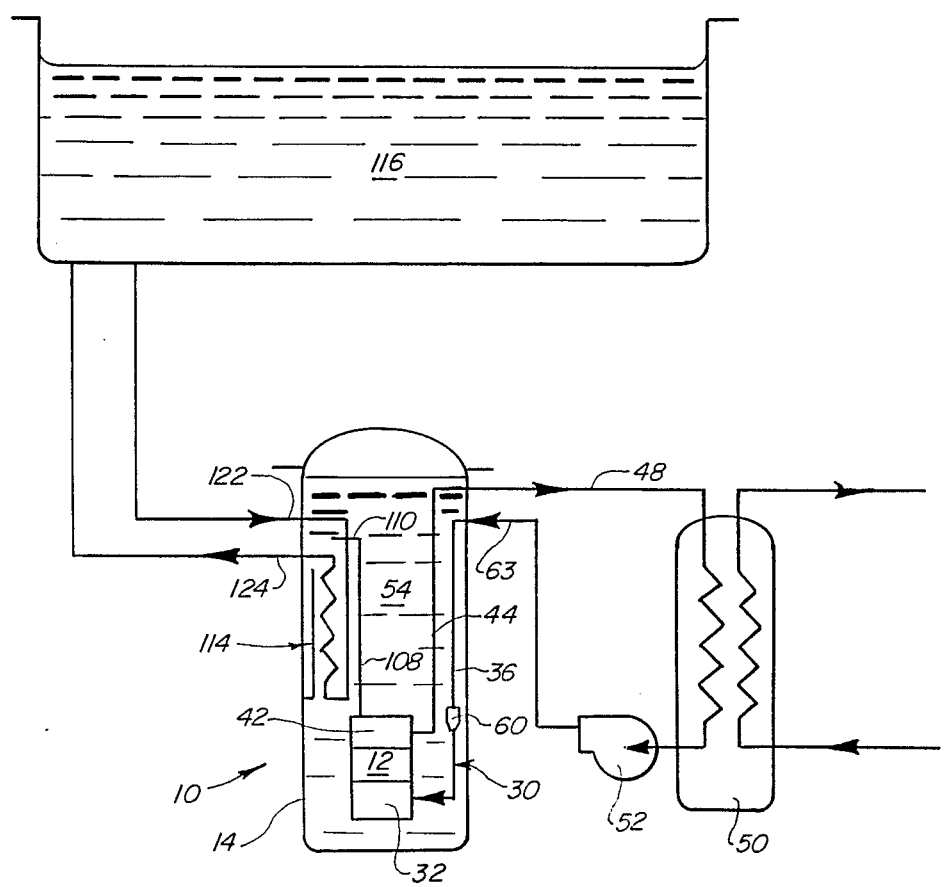
FIG. 5 is a schematic drawing illustrating the reactor of FIG. 1 in conjunction with a heat sink and a heat exchanger.

The core 12 is located near the bottom of the vessel 14, and has a plurality of passages extending from its lower end 24 to its upper end 26 to enable flow of coolant therethrough. During normal operation, primary coolant enters the reactor vessel 14 through an inlet port 28 and travels therefrom through an inlet conduit system 30 to the core 12. The inlet conduit system 30 herein comprises an inlet chamber 32 providing a plenum 34 beneath the core 12 and an inlet pipe 36 extending from the inlet port 28 to the inlet chamber 32. A flow distribution shroud 38 is provided in the inlet chamber 32 to distribute flow approximately evenly over the area of the lower end 24 of the core 12. The coolant flows upwardly through the core 12 from the inlet plenum 34 to an outlet conduit system 40 which includes an outlet chamber 42 defining an outlet plenum 43 located above the core 12 and an outlet pipe 44 extending therefrom to an outlet port 46 near the upper end of the side wall 16 of the vessel 14. The outlet port 46 typically communicates with exterior piping 48 which carries the primary coolant to a heat exchanger 50 (FIG. 5) for extracting heat therefrom. A pump 52

(FIG. 5) is typically employed to maintain circulation of the fluid through the core 12.

Due to the possibility of failure of the pump 52, or some other occurrence which might interrupt supply of primary coolant to the inlet port 28, it is desirable for the reactor 10 to have a secondary system for providing coolant flow through the core 12 to prevent the core from overheating.

To this end, the core 12 is located beneath the surface of a pool 54 of relatively cool liquid which functions as a secondary coolant, and means are provided to enable circulation of the secondary coolant from the pool 54 through the core 12 to remove heat therefrom by natural convection in the absence of forced primary coolant circulation. To provide a path for flow of secondary coolant from the pool 54, the inlet conduit system 30 has one or more openings 56 therein communicating with the pool 54, and the outlet conduit system 40 has one or more openings 58 therein also communicating with the pool 54 so that, upon cessation of forced coolant circulation, the difference in density between the hot coolant in the core 12 and the relatively cold coolant in the pool 54 causes coolant within the core 12 to rise, drawing secondary coolant from the pool 54 into the inlet conduit system 30 through the openings 56 therein, and establishing circulation of secondary coolant upwardly through the core 12 into the outlet chamber 42 and thence through the openings 58 in the outlet conduit system 40 back to the pool 54.

During normal operation, it is desirable that little or no flow occur between the secondary coolant in the pool 54 and the coolant in the primary cooling circuit, i.e., the primary coolant flowing through the inlet and outlet conduit systems 30, 40. More particularly, it is desirable that means be provided to prevent flow either out of or into the openings 56 in the inlet conduit system 30 and either into or out of the opening 58 in the outlet conduit system 40 through the pool 54, bypassing the core 12. However, it is desirable to accomplish this without the use of components which might prevent flow of secondary coolant through the core after failure of the primary cooling system. As noted above, past attempts to solve this problems have involved reactors wherein the flow rate of the primary coolant is determined by the core reactivity.

In accordance with the present invention, means are provided to enable forced flow of primary coolant at a rate selected independently of core reactivity without permitting substantial flow through the openings 56 and 58. This is accomplished in the preferred embodiment by increasing the coolant velocity within the inlet conduit system 30 adjacent the openings 56 therein so as to reduce pressure locally by an amount approximately equal to the pressure drop across the core at any given flow rate. This enables a desired pressure differential to be maintained across the core so as to provide adequate coolant flow therethrough, with little or no flow through the openings 56, 58 in the respective conduit systems 30, 40. The means to increase the coolant velocity preferably comprises one or more venturi throats 60 for restricting the interior cross-sectional area of the inlet conduit system 30 adjacent the openings 56 therein. In the illustrated embodiment, the openings 56 in the inlet conduit system take the form of transverse annular gaps in the venturi throats 60.

Turning to a more detailed description of the illustrated inlet conduit system 30, the inlet port 28 is located near the top of the side wall 16 of the reactor vessel 14, and the pipe 36 connecting the inlet port to the inlet chamber beneath the core has a 90° elbow 62 at its upper end to enable it to carry fluid from a horizontal exterior pipe 63 (FIG. 5) vertically downwardly along the interior 64 of the side wall 16. At an elevation near the lower end of the vessel, the inlet pipe 36 is bifurcated into a pair of nozzles 66. Located beneath each nozzle 66 and separated therefrom by a narrow annular gap 56 is a diffuser 68 for receiving flow from its associated nozzle 66. Each diffuser 68 extends downwardly to the inlet chamber 32 beneath the core 12. The nozzles 66 and diffusers 68 provide a pair of parallel venturi throats 60 which lower pressure within the inlet conduit system 30 adjacent the openings 56. Use of a pair of venturi throats 60 improves reliability in that obstruction of one would not disable the secondary cooling system, since flow could proceed through the second.

As noted above, it is desirable to have little or no flow through the openings 56, 58 during normal operation. To achieve this, the venturi throats 60 are configured so that the difference between the pressure increase from the venturi throats 60 to the inlet plenum 34 and the pressure drop from the inlet plenum 34 to the outlet pleunum 43 is equal to the difference in static pressure in the pool 54 between the openings 56 in the inlet conduit system 30 and the openings 58 in the outlet conduit system 40. This balancing may be expressed by the equation $$(p_2-p_1)-(p_2-p_3)=p_{3a}-p_{1a}$$

where $p_1$ is the static pressure of the relatively high velocity coolant between the nozzles 66 and the diffusers 68; $p_2$ is the static pressure in the inlet plenum 34; $p_3$ is the static pressure in the outlet plenum 43; $p_{1a}$ is the static pressure in the pool 54 adjacent the nozzles 66; and $p_{3a}$ is the static pressure in the pool 54 adjacent the outlet plenum 43.

In the illustrated system, the gaps 56 between the nozzles 66 and diffusers 68 are located at the same elevation as the outlet plenum 43. Accordingly, $p_{3a}$ is equal to $p_{1a}$ and the above equation reduces to the following:

$$p_2-p_1=p_2-p_3.$$

The quantity $(p_2-p_1)$ represents the increase in pressure between the venturi throat 60 and the inlet plenum 34, and $(p_2-p_3)$ represents the pressure drop due to flow resistance within the core 12. Generally, the pressure drop due to flow resistance within the core 12 is approximately proportional to the square of the flow rate. Although heating of coolant within the core 12 tends to drive coolant upward therethrough by natural convective flow, the flow rate of primary coolant under normal operating conditions is generally so high that this effect is negligible for purposes of the present analysis.

A major advantage provided by the venturi throats 60 of the present invention is that the pressure increase between the venturi throats 60 and the inlet plenum 34 is also approximately proportional to the square of the flow rate. Accordingly, for a given core configuration and a given inlet conduit system configuration, variation of the flow rate will cause only minor variations in the static pressure difference between the venturi throats 60 and the outlet plenum 43. To compensate for such minor variations, means are provided to enable adjustment of the pressure within the venturi throats 60 independently of the flow rate therethrough.

Herein, the means to enable adjustment of the pressure within the venturi throats 60 comprises a pair of adjustable obstructions 70, one provided in each venturi throat 60. The obstructions 70 herein are generally conical, each mounted at the lower end of a vertically oriented, vertically movable rod 72 which is movably supported at its upper end. Adjustments of pressure within the venturi throats 60 can be made by adjusting the vertical positions of the respective obstructions 70 by vertical adjustments of the rods 72. The rods 72 preferably operate in unison. The venturi throats 60 and obstructions 70 are preferably configured so that the spools 70 may be used to provide flow in either direction between the interior of the venturi throats 60 and the surrounding pool 54.

The inlet chamber 32 is defined by the bottom 18 of the reactor vessel 14 and the support structure 76 for the core. The support structure 76 for the core 12 herein comprises a generally cylindrical vertical wall 78 extending upwardly from the bottom 18 of the vessel, a generally frustoconical wall 80 extending upwardly and radially inwardly therefrom, and a circular grid plate 82 which extends generally horizontally over the top of the frustoconical wall 80 and which supports the fuel elements 15.

The grid plate 82 has a number of openings therein communicating with vertical passages in the fuel elements 15 for coolant flow. It is generally desirable that the flow of coolant be distributed relatively evenly among the various fuel elements 15. To this end, a generally cylindrical skirt or shroud 84 extends downwardly from the periphery of the grip plate 82 into the inlet plenum 34. The shroud 84 extends almost to the bottom 18 of the vessel 14 adjacent the inlet pipe 36 so as to deflect coolant entering the inlet chamber 32. The lower edge 86 of the shroud 84 increases in elevation toward the opposite side of the inlet chamber 32, providing a variable width gap 90 for coolant flow between the lower edge 86 and the bottom 18 of the vessel 14.

The upper ends 92 of the fuel elements 15 are constrained by a hold-down grid 94 which prevents upward movement of the fuel elements 15. During normal operation, the magnitude of the upward force on the fuel elements 15 due to coolant flow is much smaller than their weight. However, provision of the hold-down grid 94 reduces the possibility that one or more elements 15 might be dislodged by a coolant surge or some other unusual occurence. The core is enclosed by a generally cylindrical vertical wall 95 which extends between the outlet chamber and the inlet chamber.

A plurality of control rod assemblies 96 are provided for insertion into the core 12. A typical control rod assembly 96 is illustrated in FIG. 1. The control rod assemblies 96 are supported at the upper end of the vessel 14.

Water flowing upwardly through the core 12 is received by the outlet chamber 42. The outlet chamber 42 is generally ovoid in shape as viewed in plan, and includes a substantially vertical side wall 98 which encloses the area above the core 12 and extends radially outward about the lower end of the outlet pipe 44.

The outlet pipe 44 extends substantailly vertically upward from the outlet chamber 42 along the interior 64 of the side wall 16 of the vessel at a location diametrically opposite that of the inlet pipe 36. Like the inlet pipe 36, the outlet pipe 44 has a 90° elbow 100 at its upper end connecting it to a horizontal exterior pipe 48.

A shroud 102 extends upwardly about the periphery of the core 12 into the outlet chamber 42 to aid in distribution of coolant as it emerges from the upper ends of the fuel elements 15 so as to maintain approximately evenly distributed pressure at the outlet ends of the fuel elements 15. The shroud 102 is similar in shape to the shroud 84 extending into the inlet chamber 32, having its upper edge 104 varying in elevation to distribute pressure approximately evenly over the upper end 26 of the core 12.

The liquid in the pool 54 is typically maintained at a relatively low temperature, such as 140° F. The coolant in the primary fluid circuit enters the vessel 14 at a higher temperature, such as 200° F., and is heated to a still higher temperature by the core 12 as it flows therethrough. It is desirable to limit heat transfer from the coolant to the pool liquid, because such heat transfer decreases the efficiency of the system. The above-described venturi throats 60 limit intermixing of the two fluids during normal opeation, which aids in limiting heat transfer therebetween. In addition, thermal insulation 105 is provided along the inlet conduit system 30, outlet conduit system 40, and cylindrical wall 95 about the core 12 to limit conductive heat transfer therethrough.

Turning to a more detailed description of the function of the secondary cooling circuit, to enable communication between the interior of the outlet chamber 42 and the pool 54 in the event of failure of the primary circulation system, one or more openings 58 are provided in the top of the outlet chamber 42 to enable upward flow of coolant therethrough. Preferably, two such openings 58 are provided, one on each side of the outlet chamber 42. Extending upwardly from each opening 58 is a T-shaped pipe assembly 106 composed of a vertical riser 108 and a horizontal sparger 110. Each sparger 110 has openings 112 at its opposite ends so that coolant may flow upward through the riser 108 and out both ends of the sparger 110 into the pool 54.

During natural convection through the secondary cooling system, coolant enters the gaps 56 in the venturi throats 60, flows downwardly through the diffusers 68 into the inlet chamber 32, flows upwardly through the core 12 into the outlet chamber 42, flows upwardly through the risers 108, and flows horizontally through the openings 112 at the ends of the spargers 110 into the pool 54. The driving force for the secondary cooling system is provided by expansion of the fluid therein as it is heated by the core 12. This expansion lowers the density of the fluid in the core 12 relative to the lower temperature coolant in the difusers 68 so that a convection current results.

Figure 4:
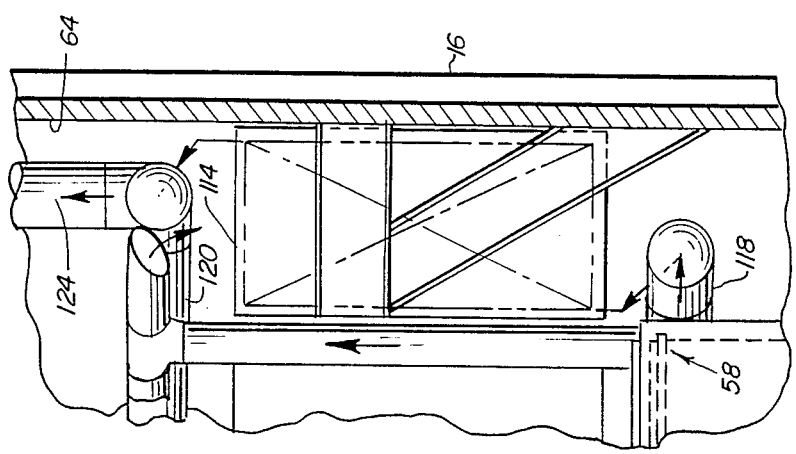
FIG. 4 is a partly diagrammatic sectional view taken along line 4—4 in FIG. 3 and looking in the direction of the arrows.
Figure 3:
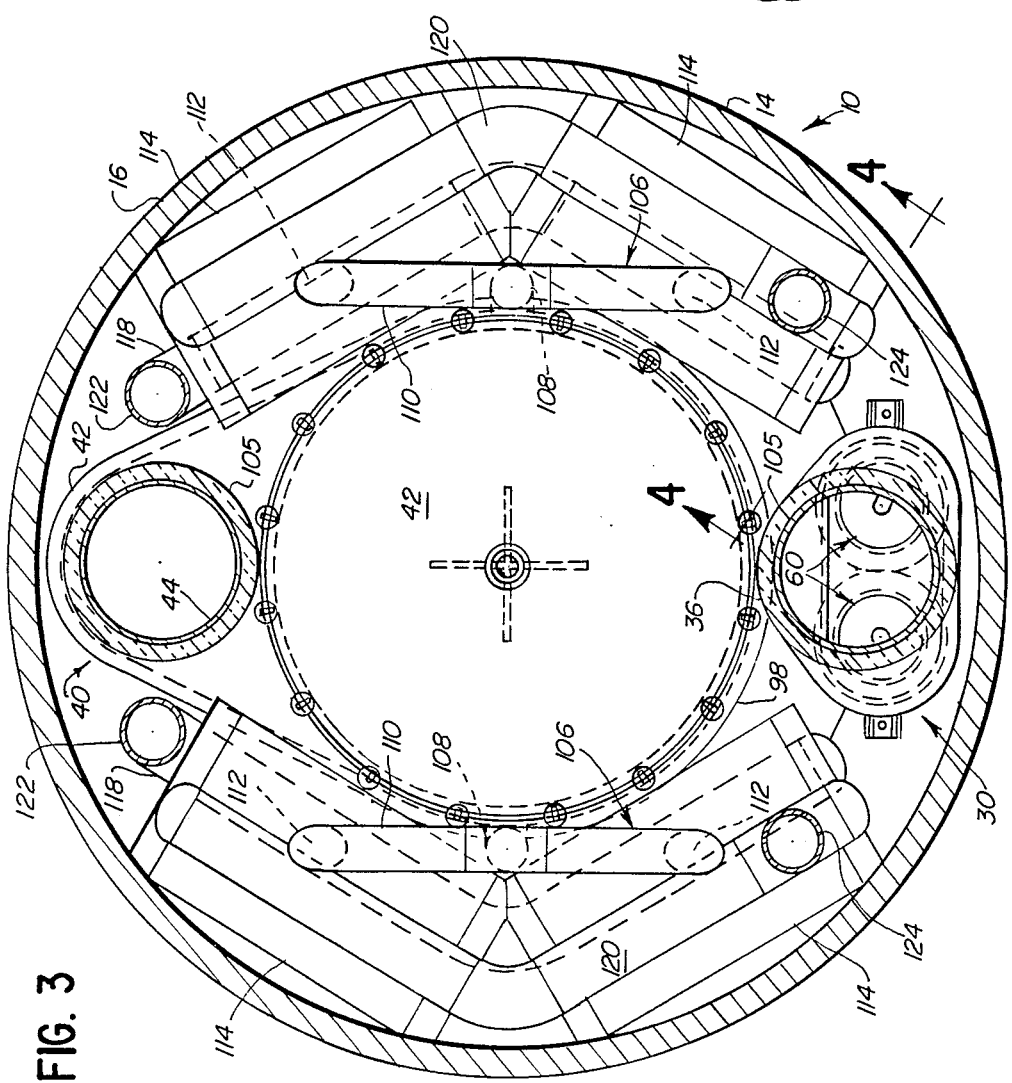
FIG. 3 is a partly diagrammatic sectional view taken substantially along line 3—3 in FIG. 1 and looking in the direction of the arrows.

It will be appreciated that the effectiveness of the secondary cooling system of the present invention requires that the fluid in the pool 54 be maintained at a relatively low temperature. To this end, one or more tank coolers 114 are provided for removing heat from the pool 54. As illustrated in FIGS. 3 and 4, two tank coolers 114 are preferably provided. The tank coolers 114 are preferably located on opposite sides of the vessel 14, one beneath each of the spargers 110. Each tank cooler 114 comprises a system of piping containing a tank coolant such as water which flows through the coolers 114 and circulates through an external heat sink such as a pond 116 (FIG. 5) or other large mass of water at substantially ambient temperature. The tank coolant in the coolers 114 is preferably circulated by natural convection so that no reliance on external power is necessary for its circulation. To this end, the external heat sink 116 is preferably located at a higher elevation than the tank coolers 114 so that high temperature tank coolant will naturally flow upwardly to the heat sink after being heated in the tank coolers 114 as lower temperature tank coolant flows downwardly from the heat sink 116 to the tank coolers 114.

Referring particularly to FIGS. 3 and 4, each cooler includes an inlet header 118 and an outlet header 120 connected by a plurality of serpentine aluminum tubes (not shown) for flow of the coolant from the lower pipe to the upper pipe. To aid in maintaining natural convective flow through the aluminum tubes, the inlet header 118 is located beneath the outlet header 120 so that tank coolant flows upward through the tubes as it is heated by the surrounding pool liquid.

Tank coolant is supplied to each tank cooler 114 by a vertical inlet pipe 122 which is connected to the inlet header, and the tank coolant is carried from each cooler 114 to the heat sink by a vertical outlet pipe 124 which is conneced to the outlet header 120.

The tank coolers 114 are preferably independent of one another so that failure of one does not impede the functioning of the other. The tank coolers 114 preferably have sufficient cooling capcities that either one alone is capable of providing adequate cooling in the event of failure of the primary system.

The tank coolers 114 preferably have no valves or other components which might tend to restrict flow therethrough under any circumstances. Accordingly, during normal operation, the tank coolers 114 function to maintain the temperature of the pool 54 at a desired temperature. During normal operation, relatively little heat is transferred to the pool 54, and accordingly, the flow rate through the tank coolers 114 is relatively low. During operation of the secondary cooling system, greater heat transfer to the tank coolant within the coolers 114 will increase the convective flow rate therethrough, thus increasing the amount of heat removed from the pool 54, and eventually establishing a temperature equilibrium in the pool 54.

The fact that the tank coolant is isolated from the primary coolant which flows through the core 12 during normal operation enables the tank coolant to be circulated to an outdoor pond 116 without significant radioactive contamination of the pond 116. During operation of the secondary cooling system, irradiation of the tank coolant is still relatively low as there is no intermixing of the tank coolant with the secondary coolant, and the reactivity of the core has presumably been minimized, as by insertion of control rods.

As set forth above, the reactor 10 employs three different fluids: a primary coolant which flows through the primary cooling circuit under normal operating conditions; a secondary coolant, the pool liquid, which intermixes with primary coolant and flows through the core during emergency conditions; and a tertiary coolant, the tank coolant, which flows through the tank coolers and does not intermix with either the primary coolant or the pool liquid. Preferably, all three coolants are liquid water. In some embodiments, it may be desirable to employ a secondary coolant which decreases reactivity in the core upon entry into the core 12. For example, borated water may be used as the secondary coolant.

An important advantage of the above-described reactor lies in the ability of the venturi throats 60 to maintain the desired pressure balance between the primary coolant and the secondary coolant during start-up of the reactor. Because the pressure recovery in the venturi throats is approximately equal to the pressure drop across the core at any flow rate, maintenance of the desired pressure balance does not require addition of heat to coolant within the core 12, nor does it require any particular coolant flow rate. Accordingly, during start-up, coolant flow may be commenced with relatively little intermixing occurring between the primary coolant and the secondary coolant.

From the foregoing, it will be appreciated that the present invention provides a nuclear reactor with a novel cooling system. While a preferred embodiment has been illustrated and described herein, there is no intent to limit the scope of the invention to this or any other particular embodiment.

What is claimed is:

1. A nuclear reactor comprising:
   a closed vessel containing a pool of secondary coolant;
   a reactor core located within said pool, said core having an upper end and a lower end, and having a plurality of passages extending therebetween to enable upward flow of coolant through the core;
   an inlet conduit system for directing primary coolant to said lower end of said core, said inlet conduit system having one or more openings formed therein to enable fluid communication between said inlet conduit system and said pool;
   pumping means for effecting flow of said primary coolant into said inlet conduit system;
   an outlet conduit system located above said core for receiving coolant from said upper end of said core and carrying it to an exterior outlet pipe, said outlet conduit system having one or more openings therein to enable fluid communication between said outlet conduit system and said pool; and
   pressure reduction means for reducing fluid pressure in said inlet conduit system adjacent all of said one or more openings therein by locally increasing fluid velocity adjacent all of said one or more openings, thereby providing a balance between pressure within the inlet conduit system and pool pressure adjacent said one or more openings, substantially preventing flow of coolant through said openings in said inlet and outlet conduit system during operation of said pumping means;
   said pressure reduction means being responsive to variations in flow rate to enable forced flow of said primary coolant through said core at various rates selected independently of core reactivity without undesirable intermixing of primary and secondary coolant;
   whereby under normal operating conditions, coolant flows in a primary cooling circuit and flow through said openings is minimal, but in the event of failure of said coolant supply means, natural convection will cause secondary coolant from said pool to circulate through a secondary cooling circuit into said openings in said inlet conduit system, through said core, and out of said openings in said outlet conduit system.

2. A nuclear reactor in accordance with claim 1 further comprising means for cooling said pool of secondary coolant by natural convection.

3. A nuclear reactor comprising:
a closed vessel containing a pool of secondary coolant;
a core located within said pool, said core having an upper end and a lower end, and having a plurality of passages extending therebetween to enable upward flow of coolant through the core;
an inlet conduit system for directing primary coolant to said lower end of said core from an exterior coolant supply pipe, said inlet conduit system having one or more openings formed therein to enable fluid communication between said inlet conduit system and said pool;
an outlet conduit system located above said core for receiving coolant from said upper end of said core and carrying it to an exterior outlet pipe, said outlet conduit system having one or more openings therein to enable fluid communication between said outlet conduit system and said pool;
pumping means for forcing liquid coolant into said inlet conduit system; and
means for locally increasing coolant velocity within said inlet conduit system all of adjacent said openings therein so as to balance pressure within said inlet conduit system adjacent said openings with pressure in said pool adjacent said openings;
whereby under normal operating conditions, coolant flows in a primary cooling circuit which includes said exterior pipes and flow through said openings is minimal, but in the event of failure of said coolant supply means, natural convection will cause secondary coolant from said pool to circulate through a secondary cooling circuit into said openings in said inlet conduit system, through said core, and out of said openings in said outlet conduit system.

4. A reactor in accordance with claim 3 wherein said inlet conduit system includes a length of pipe having a minimum internal cross-sectional area adjacent said openings.

5. A nuclear reactor in accordance with claim 3 wherein said means for locally increasing coolant velocity comprises one or more venturi throats.

6. A nuclear reactor in accordance with claim 5 wherein each of said openings in said inlet conduit system comprises an annular gap in one of said venturi throats.

7. A nuclear reactor in accordance with claim 6 further comprising adjustable means for varying internal cross-sectional area in said one or more venturi throats.

8. A reactor in accordance with claim 7 wherein said adjustable means comprises one or more movable, generally conical obstructions.

9. A reactor in accordance with claim 3 further comprising means for cooling said pool.

10. A reactor in accordance with claim 9 wherein said means for cooling said pool includes a reservoir of tertiary coolant located outside of said vessel; a cooler for circulation of said tertiary coolant located within said vessel; and means for enabling circulation of said tertiary coolant between said reservoir and said cooler and through said cooler, and wherein said reservoir is located so as to enable circulation of coolant from said reservoir to said cooler by natural convection.

11. A reactor in accordance with claim 10 wherein said cooler is configured so that said tertiary coolant is heated as it flows through said cooler and travels upward as it is heated.

12. A nuclear reactor comprising:
a closed vessel containing a pool of secondary coolant;
a core located within said pool, said core having an upper end and a lower end, and having a plurality of passages extending therebetween to enable upward flow of coolant through the core;
an inlet conduit system for directing primary coolant to said lower end of said core from an exterior coolant supply pipe, said inlet conduit system having one or more openings formed therein to enable fluid communication between said inlet conduit system and said pool;
an outlet conduit system located above said core for receiving coolant from said upper end of said core and carrying it to an exterior outlet pipe, said outlet conduit system having one or more openings therein to enable fluid communication between said outlet conduit system and said pool;
pumping means for forcing liquid coolant into said inlet conduit system; and
means for locally increasing coolant velocity within said inlet conduit system adjacent said openings therein so as to balance pressure within said inlet conduit system adjacent said openings with pressure in said pool adjacent said openings;
whereby under normal operating conditions, coolant flows in a primary cooling circuit which includes said exterior pipes and flow through said openings is minimal, but in the event of failure of said coolant supply means, natural convection will cause secondary coolant from said pool to circulate through a secondary cooling circuit into said openings in said inlet conduit system, through said core, and out of said openings in said outlet conduit system;
said means for locally increasing coolant velocity comprising one or more venturi throats;
each of said openings in said inlet conduit system comprising an annular gap in one of said venturi throats;
said nuclear reactor further comprising adjustable means for varying internal cross-sectional area in said one or more venturi throats;
said adjustable means comprising one or more movable, generally conical obstructions.

* * * * *

UNITED STATES PATENT AND TRADEMARK OFFICE
CERTIFICATE OF CORRECTION

PATENT NO. : 4,759,899

DATED : July 26, 1988

INVENTOR(S) : Koutz, et al.

It is certified that error appears in the above-identified patent and that said Letters Patent is hereby corrected as shown below:

Column 4, line 31, change "$P_{3a} - P_{1a}$" to --$P_{3a} - P_{1a}$--.

Column 6, line 53, change "difusers" to --diffusers--.

Column 7, line 23, change "conneced" to --connected--.

Column 7, line 27, change "capcities" to --capacities--.

Column 8, line 49, change "system" to --systems--.

Column 9, line 23, change "all of adjacent" to --adjacent all of--.

Signed and Sealed this

Thirteenth Day of December, 1988

Attest:

DONALD J. QUIGG

*Attesting Officer*  *Commissioner of Patents and Trademarks*